United States Patent
Forlenza et al.

(10) Patent No.: US 6,553,103 B1
(45) Date of Patent: Apr. 22, 2003

(54) COMMUNICATION MACRO COMPOSER

(75) Inventors: Randy Forlenza, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 09/620,351

(22) Filed: Jul. 20, 2000

(51) Int. Cl.$^7$ .............................................. H04M 11/00
(52) U.S. Cl. ................... 379/93.01; 379/52; 379/90.01; 340/7.31
(58) Field of Search ........................... 379/90.01, 93.01, 379/93.27, 93.17, 93.18, 93.24, 52; 340/7.28, 7.3, 7.31, 7.53, 7.57

(56) References Cited

U.S. PATENT DOCUMENTS

| | | | |
|---|---|---|---|
| 4,885,577 A | * 12/1989 | Nelson | 340/825.44 |
| 5,031,206 A | 7/1991 | Riskin | 379/97 |
| 5,200,988 A | * 4/1993 | Riskin | 379/52 |
| 5,835,571 A | 11/1998 | Johnson | 379/67 |
| 5,894,506 A | * 4/1999 | Pinter | 379/88.23 |
| 5,952,942 A | 9/1999 | Balakrishnan et al. | 341/20 |
| 6,005,498 A | 12/1999 | Yang et al. | 341/23 |
| 6,028,921 A | 2/2000 | Malik et al. | 379/201 |
| 6,085,069 A | * 7/2000 | Sharpe | 455/31.33 |
| 6,297,726 B1 | * 10/2001 | Yamazaki | 340/7.2 |

FOREIGN PATENT DOCUMENTS

JP 407245751 A * 9/1995 ............ H04N/7/14
JP 410260960 A * 9/1998 ............ G06F/17/21

* cited by examiner

*Primary Examiner*—Melur Ramakrishnaiah
(74) *Attorney, Agent, or Firm*—David A. Mims, Jr.; Rudolf O. Siegesmund (57) ABSTRACT

A method and apparatus is disclosed that allows a user of a message transmission device such as a digital phone or a pager to create a user defined list of words, symbols, macros or graphics, and further allows the user to use each entry as a macro, in order to select words or string text from a predefined dictionary and place the expanded content of the macro in a message on a display when composing a text message. When a message is composed, a linked list of words, symbols, macros or graphics from an existing dictionary comprises the message. Additionally, text or voice recordings may be inserted into the message. Also, when the user receives an inbound message, the contents of the message can be used to update the dictionary by selecting (e.g. for example, highlighting or other selection mechanisms) each word or several words in the message, followed by storing the highlighted word or text and selecting the complete message and storing its contents as a macro. The macro is associated with the identification (phone number, e-mail address) of the original sender via a vocabulary grouping to simplify selecting the grouping when sending messages to that identifying number. Once a message is composed, if the composing device contains a display, it can be viewed and scrolled for final review prior to transmission. The invention greatly simplifies the creation and use of text messaging, and is particularly useful in devices such as pagers and phones that have very limited input devices.

36 Claims, 5 Drawing Sheets

COMMUNICATION MACRO COMPOSER

FIELD OF THE INVENTION

The present invention relates to the creation of messages by selecting and linking words, symbols, macros or graphics to create a message from a user defined list and/or inserting text or voice recordings in said message for transmission by a communication device.

BACKGROUND OF THE INVENTION

U.S. Pat. No. 6,028,921 discloses a method for transmitting a message from a message delivery database in a calling name delivery service environment. A communication is received from a calling party directory number and directed to a code number. In response to the communication, a called party directory number associated with the communication is obtained. Next, an indication of a selected message is received from a list of messages. A prefix corresponding to the selected message is obtained from the message delivery database. The prefix and the calling party directory number are populated in a signaling message pertaining to the communication. The signaling message containing the prefix and the calling party directory number is transmitted to a network element serving the called party directory number. In response to receipt of the signaling message of the network element, a message translation of the prefix is obtained from a message translation database, and the message translation is transmitted to a called part display unit.

U.S. Pat. No. 5,952,942 discloses a method and apparatus for inputting text messages from a keypad by activating keys of a keypad, where a key represents various characters. Input is delivered to a processor corresponding to the keys activated. A dictionary is searched for candidate combinations of characters corresponding to the keys activated. The candidate combinations are rank ordered, for example using language model data and feedback is provided to a user indicating at least a highest rank ordered candidate combination.

U.S. Pat. No. 5,835,571 discloses a method for automatically interfacing a telephone to an automated telephone service. The system allows a user to record interfacing to an automated telephone service. The recording can be saved to personal local storage or to a shared storage area for use by a plurality of users. The system allows a user to invoke the saved recording of the interface activity at any time so that the automated telephone service is interfaced to in an automatic manner. The system monitors for the press of telephone buttons, such as Dual Tone Multi Frequency (DTMF) signals. The system determines whether a telephone button has been pressed or a command has been entered. If a telephone button has been pressed and record mode is set to ON, the system records a macro, which can subsequently be used to automatically navigate within an automated service. A macro is recorded by saving a button type that is determined by the duration of the telephone button depressed, the button, and the time since press of the previous entry. The two types of buttons that allow interfacing to an automated service are immediate and wait. Commands are entered for governing system operation. Commands include saving a macro to a local library; invoking a macro by button or by voice; browsing a macro library; and deleting a macro. When the desired macro is recorded, the user can save the macro with a desired invocation sequence, thereby allowing invoking the macro by voice or with buttons. The system uses information stored in the macro to coordinate delivering DTMF signals in an appropriate and proper manner to an automated telephone service.

U.S. Pat. No. 6,005,498 discloses a reduced keyboard entry method and apparatus which provides a method and apparatus for entry of words using a small number of key presses on a reduced keypad having multiple symbols associated with at least one key. The method and apparatus uses validity rules to rearrange the order of presentation of the multiple alphabet symbols associated with a single key on the keypad, automatically eliminate the presentation of invalid alphabet symbols, and allows the entry of additional information such as tone markers. Additionally, the method and apparatus uses a dictionary to convert phonetic syllables into Chinese characters. The reduced keyboard entry apparatus is implemented in a cellular telephone; however, it may also be implemented in a standard wired telephone, a personal digital assistant (PDA), a fax machine, a pager, an electronic label maker, or other electronic devices with reduced keypads, which have fewer keys than alphabet symbols. A keypad and display are coupled to a microprocessor, which takes input from the keypad and also transmits output to the display. A memory such as ROM is also coupled to the microprocessor. This memory is preferably an EEPROM (Electronically Erasable Programmable Read Only Memory) holding two separate blocks of information; validity rules and a dictionary. Another memory, preferably RAM is coupled to the microprocessor for storing letters as they are entered via the keypad, a temporary list of Chinese characters associated with an entered phonetic syllable, stored short messages and address information.

U.S. Pat. No. 5,031,206 discloses a method and apparatus for identifying words entered on DTMF pushbuttons, in which the identity of a word entered on DTMF pushbuttons is determined by identifying letters according to their frequency in groups of 2s and 3s and up to R letter groups. Initially, a sender will type a word on a DTMF pushbutton pad. Since each button represents three (3) possible letters, or four in the case of 7 (PQRS) and 9 (WXYZ), the system will look up the possible meanings for the word from an internal dictionary, then the system will search against a Forward or Reverse Dictionary to guess at the identity of fragments from the beginning and ending of the word. Then it will guess the identify of each letter according to its relative frequency in the groups of 3s known as Trigrams, or in groups of 2s known as Digrams. The Trigrams are preferably arranged in five (5) files to identify the first second, third and final letters of a word as well as any non-specified middle location. The system can be extended to any letter grouping of size n where n is two or more. Once identified, the word is stored as part of a message and then transmitted as ASCII digital information over a packet data network to a remote receiver where digital to voice synthesis converts the message into audio. Other delivery methods include alphanumeric pagers, FAX, E-Mail, telex, computer-printed output, telegrams and cables.

The prior art does not disclose a method of composing a message by selecting and linking words, symbols, graphics, macros and/or graphics in a communication device such as a digital phone or pager. The current digital phone technology allows a user to compose a text message to store in a scratch pad by selecting individual letters entered through the numeric keypad. The task of entering a message is very tedious and error prone. What is needed beyond the prior art is the ability to create a user defined word list that allows linking of multiple types of entries for composing and sending messages. Providing a linking capability enhances ease of use, not only for the general population but for individuals who depend on written communication, such as persons with hearing or speech impairment.

SUMMARY OF THE INVENTION

The invention which meets the needs identified above is an apparatus and method that allows a user of a message transmission device such as a digital phone or a pager to create a user defined list of words, symbols, macros or graphics, and further allows the user to use each entry as a macro, in order to select words or string text from a predefined dictionary and place the expanded content of the macro in a message on a display when composing a text message. When a message is composed, a linked list of words, symbols, macros or graphics from an existing dictionary comprises the message. Additionally, text or voice recordings may be inserted into the message. Also, when the user receives an inbound message, the contents of the message can be used to update the dictionary by selecting (e.g. for example, highlighting or other selection mechanisms) each word or several words in the message, followed by storing the highlighted word or text and selecting the complete message and storing its contents as a macro. The macro is associated with the identification (phone number, email address) of,the original sender via a vocabulary grouping to simplify selecting the grouping when sending messages to that identifying number. Once a message is composed, if the composing device contains a display, it can be viewed and scrolled for final review prior to transmission. The invention greatly simplifies the creation and use of text messaging, and is particularly useful in devices such as pagers and phones that have very limited input devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
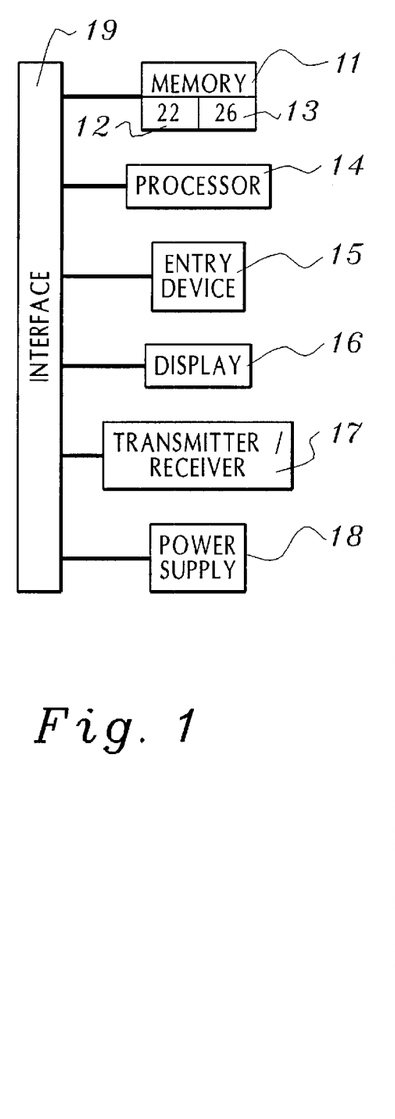
FIG. 1 depicts a block diagram of the message transmission device.

FIG. 1 depicts an embodiment of hardware in which the linking method of macro and message construction can be implemented. Message transmission device 10 has memory 20, processor 30, entry device 40, display 50, transmitter/receiver 60 and power supply 70 which are all connected to interface 19. Message transmission device 10 may be a digital telephone which as used herein means a telephone containing a digital signal processor. Memory 20 is electronically connected to processor 30. As used herein, "memory" means a storage medium such as Random Access Memory, Electrically Erasable Programmable Read Only Memory (EEPROM) or other storage mechanism. The term processor, as used herein, includes, without limitation, the following: (1) a functional unit that interprets and executes instructions having at least an instruction control unit and an arithmetic and logic unit; (2) one or more integrated circuits that process coded information and perform a task; (3) a processor whose elements have been miniaturized into one or a few integrated circuits; (4) a microchip containing integrated circuits that executes instructions; (5) a central processing unit on a single chip; (6) an integrated circuit designed for high-speed data manipulation such as a Digital Signal Processor (DSP). Entry device 40 is electronically connected to processor 30. As used herein, "entry device" means a keyboard, keypad, microphone, touch screen or overlay for handwriting recognition. Keyboard means an arrangement of typing and function keys laid out in a specified manner; a systematic arrangement of keys by which a machine is operated or by which data are entered; a device used to encode data by key depression, which cause generation of the selected code element; a group of numeric keys, alphabetic keys, or function keys used for entering information into a terminal and into the system. Keypad means a small, often hand held keyboard. Touch screen means (1) a display device, that allows the user to interact with a computer system by touching an area on its screen; or (2) a touch-sensitive display screen on a visual display unit. Microphone means a device that converts sound waves into analog electrical signals, and additional hardware can convert the microphone's output into digital data that a computer can process. Processor 30 is electronically connected to display 50, receiver/transmitter 60 and power supply 70. Memory 20 has first storage area 22 and second storage area 26. First storage area 12 contains program 24 and second storage area 26 contains dictionary 18. As used herein, "display" means (1) an output unit that gives a visual representation of data; (2) a device for electronically displaying text, symbols or graphics. Display 50 allows the user to navigate the dictionary, edit messages, to display received messages and to select words or phrases or other content from received messages. For example, when an inbound message is received, the contents of the message can be used to update the dictionary by selecting (e.g., for example, highlighting or other selection mechanism) each word or several words in the message, followed by storing the highlighted word (or words) or by selecting the complete message and storing the contents as a macro.

Figure 1A:
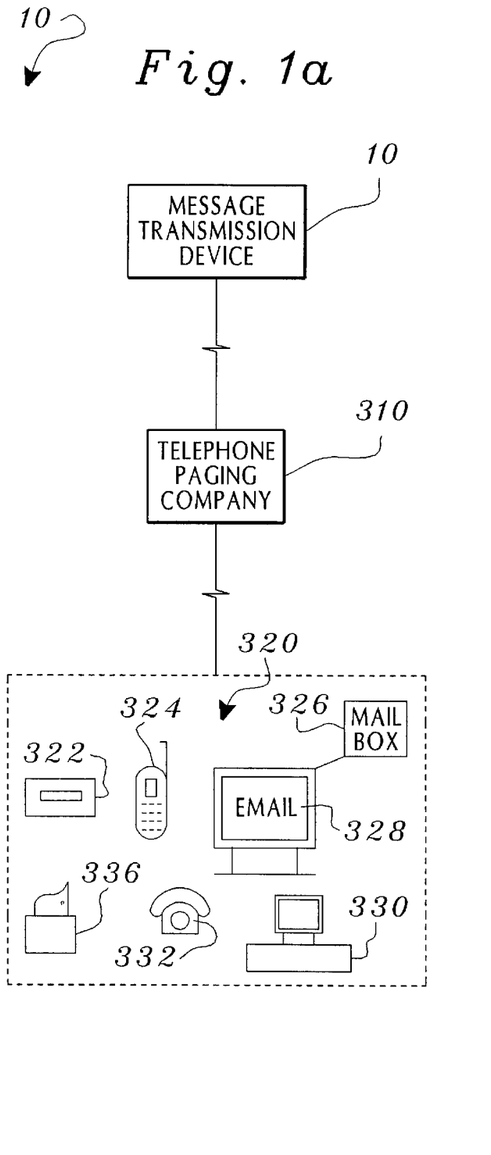
FIG. 1A depicts the system environment.

FIG. 1A depicts the system environment. Message transmission device 10 transmits its message to telephone/paging company 310. Telephone/paging company 310 receives the message sent by message transmission device 10 and sends the message to receiver 320. Receiver 320 may be pager 322, cellular (digital) phone 324, mail box for an e-mail address 326, display monitor 328 for mail box 326, computer 330, telephone 332 or telefax machine 336.

Figure 2:
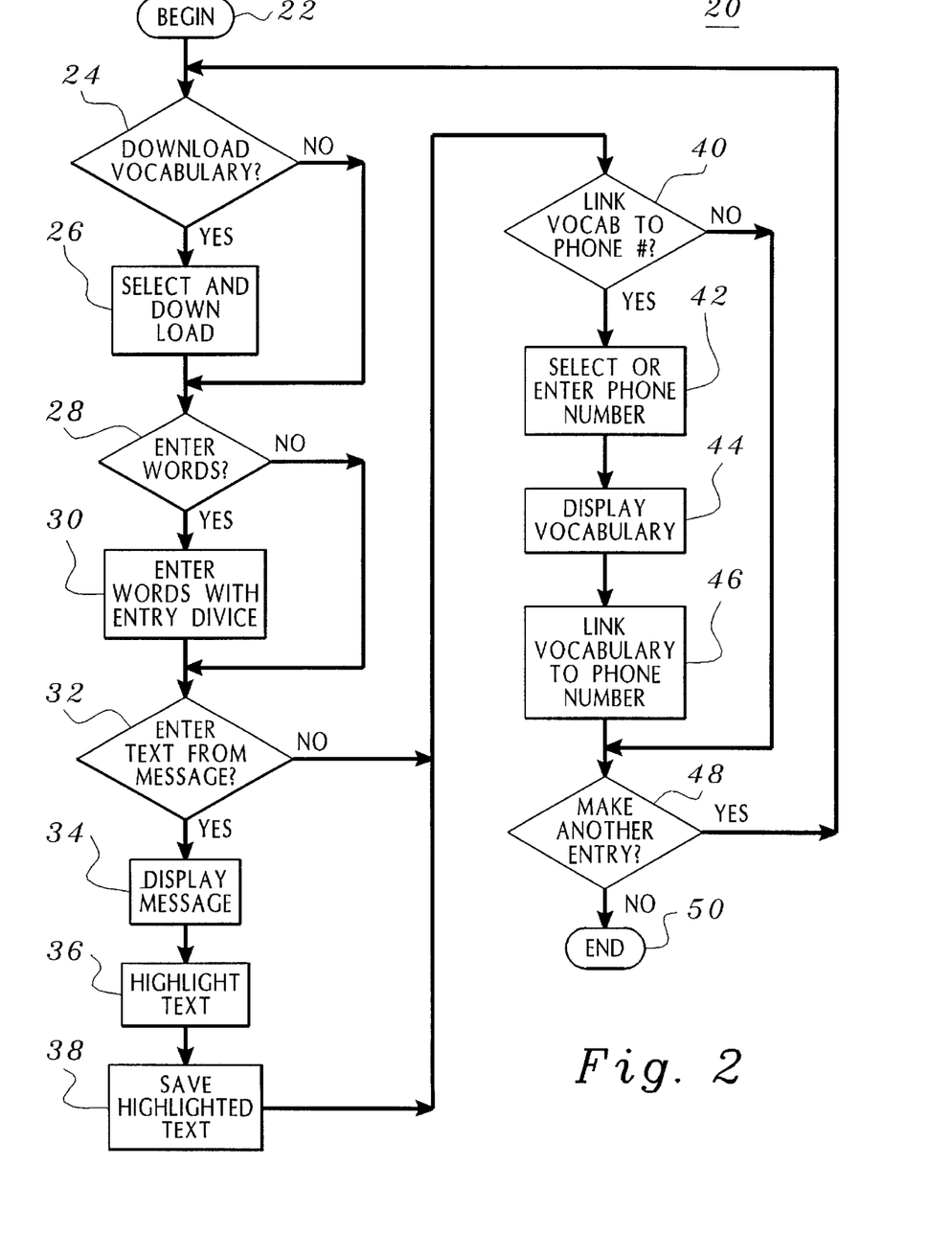
FIG. 2 depicts a flow diagram of the dictionary creation.

FIG. 2 depicts a flow chart for the dictionary program. The dictionary can be created in a variety of ways. First, pre-packaged lists of words and phrases can be downloaded directly into the memory (14). For example, an airline company may offer an airline or traveler vocabulary group that consists of words commonly used in transactions involving the purchase of airline tickets. On the other hand, a brokerage company may offer a financial vocabulary group that consists of words commonly used in transactions involving the purchase and sale of stocks. The phone may come pre-loaded with a listing of words and phrases chosen to meet common everyday message needs. If the user finds an available and suitable vocabulary grouping, the user may select the grouping and download the grouping into the memory (16). Second, a user may enter individual words by spelling the words with the keypad and then entering the completed word into the dictionary (20). Third, the user may enter text from displayed messages. For example, if the user receives a message, the user can display the message (24), and if the user decides that words in that message can be reused in a reply or a related message, the user can select (for example, by highlighting or other selection mechanism) the portions of the text to be saved (26) and then save the highlighted portions (28). Finally, the user can link vocabulary to a specific telephone number or other identification for a recipient. The user first selects or enters a telephone number or directory entry of the destination (32) and then displays the vocabulary from which words or macros will be linked from the available list of vocabulary entries (34). The user then enters the command to link the vocabulary to the telephone number. For example, the user may link the travel vocabulary to the airline telephone number so that when the airline telephone number is selected, the travel vocabulary is displayed. As used herein, the term "link" means to connect two elements in a data structure by index variables, pointer variables or other reference mechanisms for associating the two elements. As another example, the user could link a vocabulary list that contains words in a language different from the user's, such as Spanish. Then for messages to a person who speaks only Spanish or to a business in another country where Spanish is spoken, the user can link a vocabulary list in Spanish to that identifying number. If the user wants to make another entry to the dictionary, the program will return to the beginning (38). If the user does not want to make another entry the program will end (50).

Figure 3:
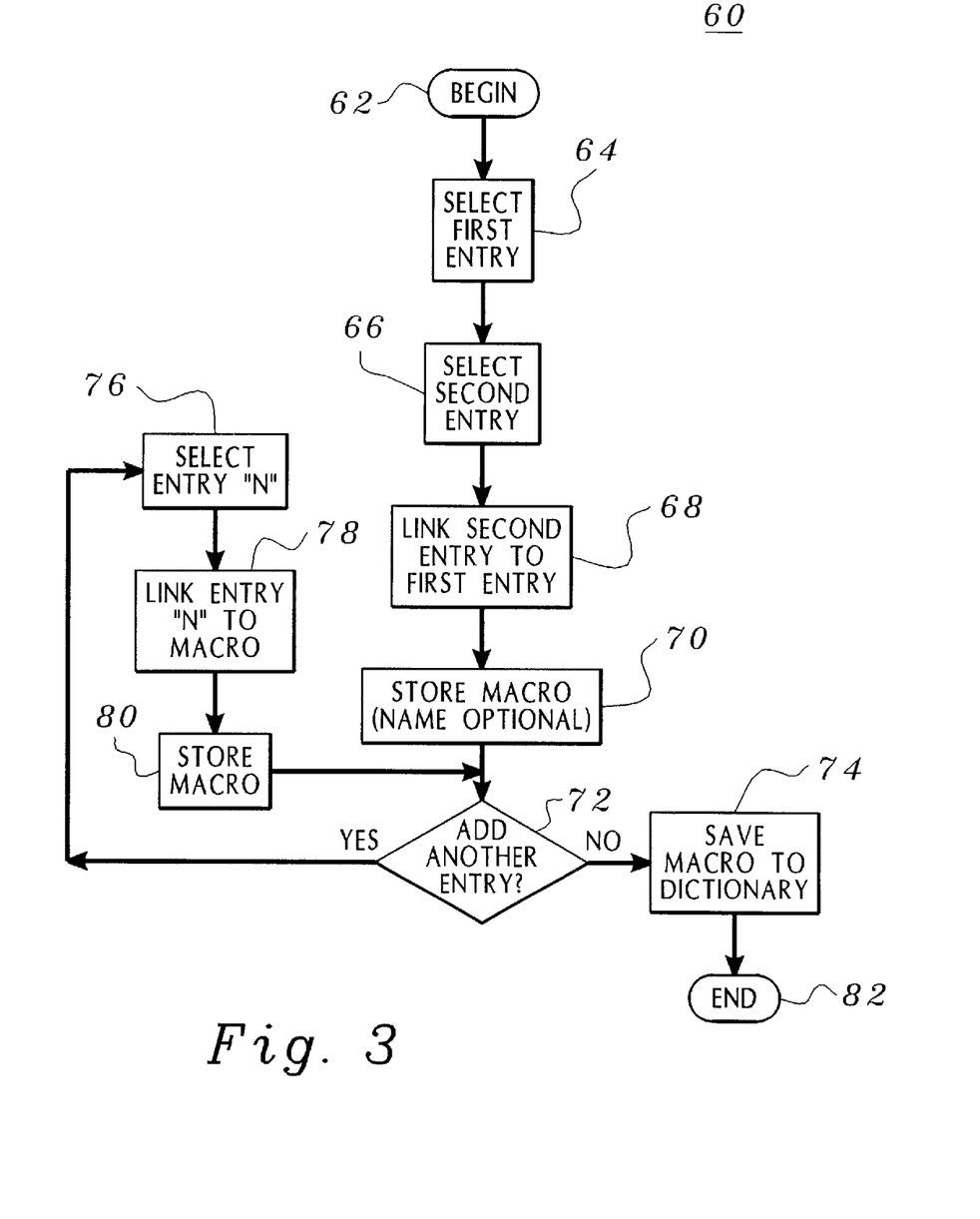
FIG. 3 depicts a flow diagram of the macro creation process.

FIG. 3 depicts a flow chart of the program for creating macros for inclusion in the dictionary. As used herein, a macro is a predefined grouping of letters, words, symbols, graphics or other macros that is stored in the dictionary. Macros can be optionally named to facilitate selection. In order to create a macro for storage, the user selects a first entry (64). The user then selects a second entry (66). The user then links the second entry to the first entry (68). The program automatically stores the macro (70). If the user desires to add another letter, word, symbol or graphic to the macro (72), the user selects another entry (76) and links the new entry to the macro (78). The program then writes the new macro to storage over the old macro (80). The process continues until the user does not desire to add any additional words, symbols or graphics to the macro (72) and the program then saves the macro to the dictionary (74). The program ends (82). Macros can be created by linking previously defined macro entries to another macro, words, symbols or graphics to expand the dictionary or to enhance the range of phrases available.

The word list likely contains the common words used for a given environment. For example, a vocabulary word list for a frequent traveler may include: "flight", "delayed", "cancel", "meeting", "call", "associate", and so on. A vocabulary list for a stock broker may include: "buy", "sell", "margin", "shares", "options", "strike price" and so on. A macro may contain action entries to allow dynamic update of the content. For example, in the above travel example, the user may create a message composed of macro "FD" that contains the linked words "flight delayed", followed by the words "reschedule", "meeting" and "at", followed by the insertion by the user of the new meeting time, "5", on the keypad followed by the selection of "a.m." or "p.m." The insertion of the numeral "5" is an example of an action entry. When the complete message is composed, it may then be stored as a macro, ready to use. If the composing device contains a display, it can be viewed and scrolled for final review prior to saving in memory for future use. Additionally, as discussed below the message may be invoked and sent as is or as modified prior to transmission.

Figure 4:
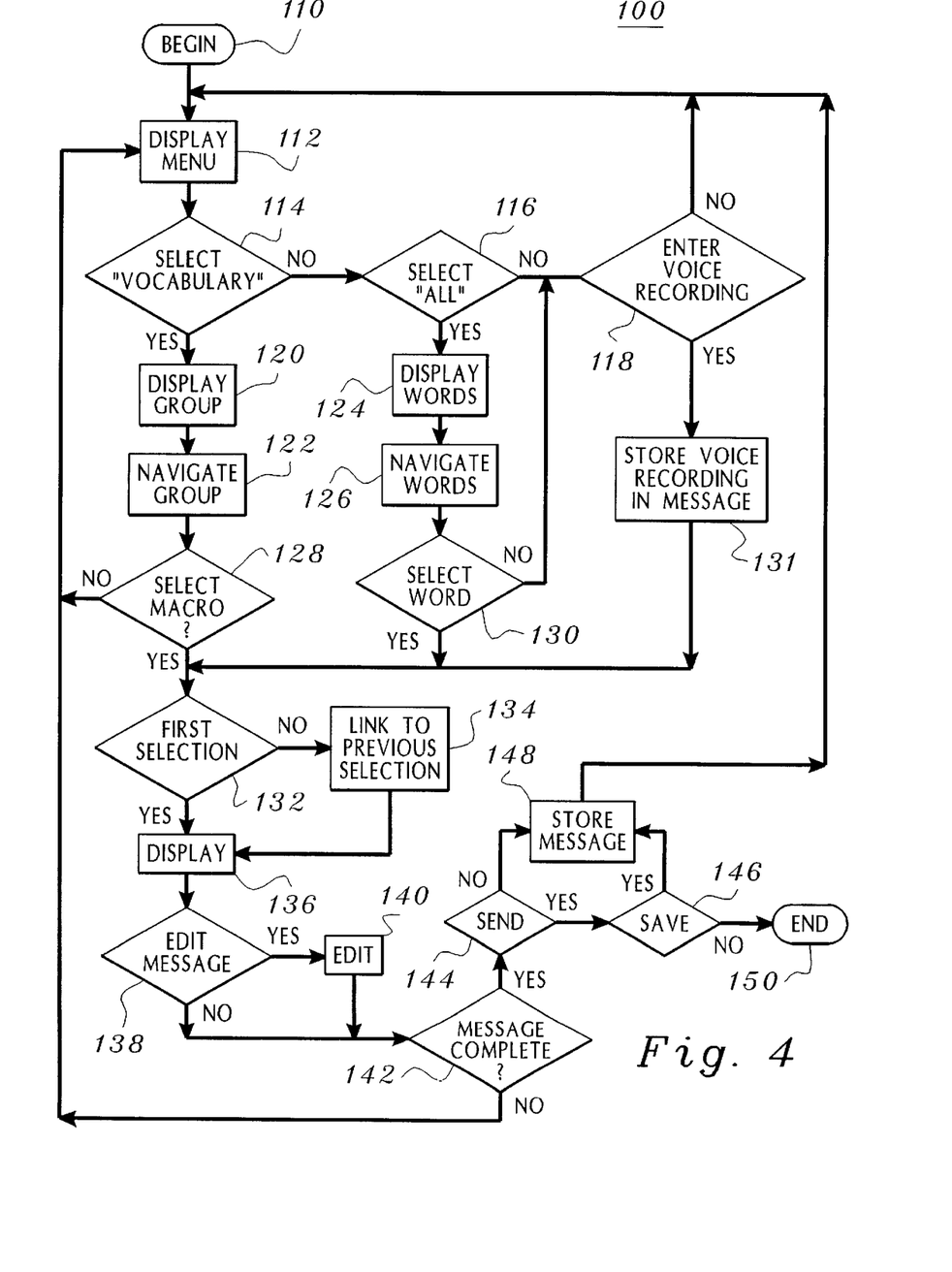
FIG. 4 depicts the message composition process.

FIG. 4 depicts the method of creating messages. When message transmitting device 10 (FIG. 1) is turned on a menu is displayed (112). The user selects from the choices described above: "all", "vocabulary", "frequent" or "recent". If the user selects "vocabulary" selections will be made from one or more functional groupings of words and phrases that comprise the vocabulary (114). The functional groupings will be displayed (120). The user will navigate the groupings and select one of the choices which will in turn display individual words and phrases within that grouping (122). When navigating the group, the user can select "frequent" or "recent". Correspondingly, the user may select "frequent" and then within that listing, select "recent". The user may select a macro from the group displayed (128). If no macro is selected, the user will go back to the menu and make another selection. If the user selected "all" the dictionary contents will displayed in alphabetical listing (124). The user will navigate the words and phrases (126). As used herein the term phrase or phrases refers to a macro or macros. When navigating the listing, the user can select from the choices of "frequent" or "recent". "Frequent" will display the words or phrases rank ordered with the most frequently used word or phrase at the top of the list and the rest of the list rank ordered in descending frequency of usage. "Recent" will display the words or phrases rank ordered with the most recently used words of phrases at the top of the list and the rest of the list rank ordered in descending recency of usage. Correspondingly, the user may select "frequent" and then within that listing, select "recent". The user selection of "all", "vocabulary", "frequent" or "recent" is one embodiment of the menu. The user can modify the presentation order to suit his or her needs.

The user may also choose to insert a voice recording or an action entry (118). If a voice recording is entered, the program will store the voice recording in the message (131) and go to step 132 to determine if this is a first selection. If the user selects a word or phrase, the program will identify whether or not the selection is a first selection (132). If the selection is a first selection, the program will display the selection (136). If the selection is not a first selection, because the user has made a prior selection, the program will link the selection to the previous selection (134). After linking the selection to the previous selection (or selections), the selected and linked words and phrases will be displayed (136). The user may edit the message displayed (138). If the user edits the message (140), the user will navigate through the constructed message. As each element of the message is highlighted, (words, symbols, macros, graphics) the user can rearrange or delete the highlighted text as needed. As used herein, the term text means individual or linked words, symbols, macros or graphics and may also include inserted voice recordings. After the user has edited the message, the program will return and determine if the message is complete (142). If the message is not complete, the user will return to the menu to select or enter the next word or phrase. If the message is complete, the user can send the message (144). The user may also save the message (146). If the user does not send the message, the message will be stored (148) and the program will return to the display menu (112). If the user does not save the message, the program will end (150). If the user saves the message, the message will be stored (148) and the program will return to the display menu (112).

Figure 5:
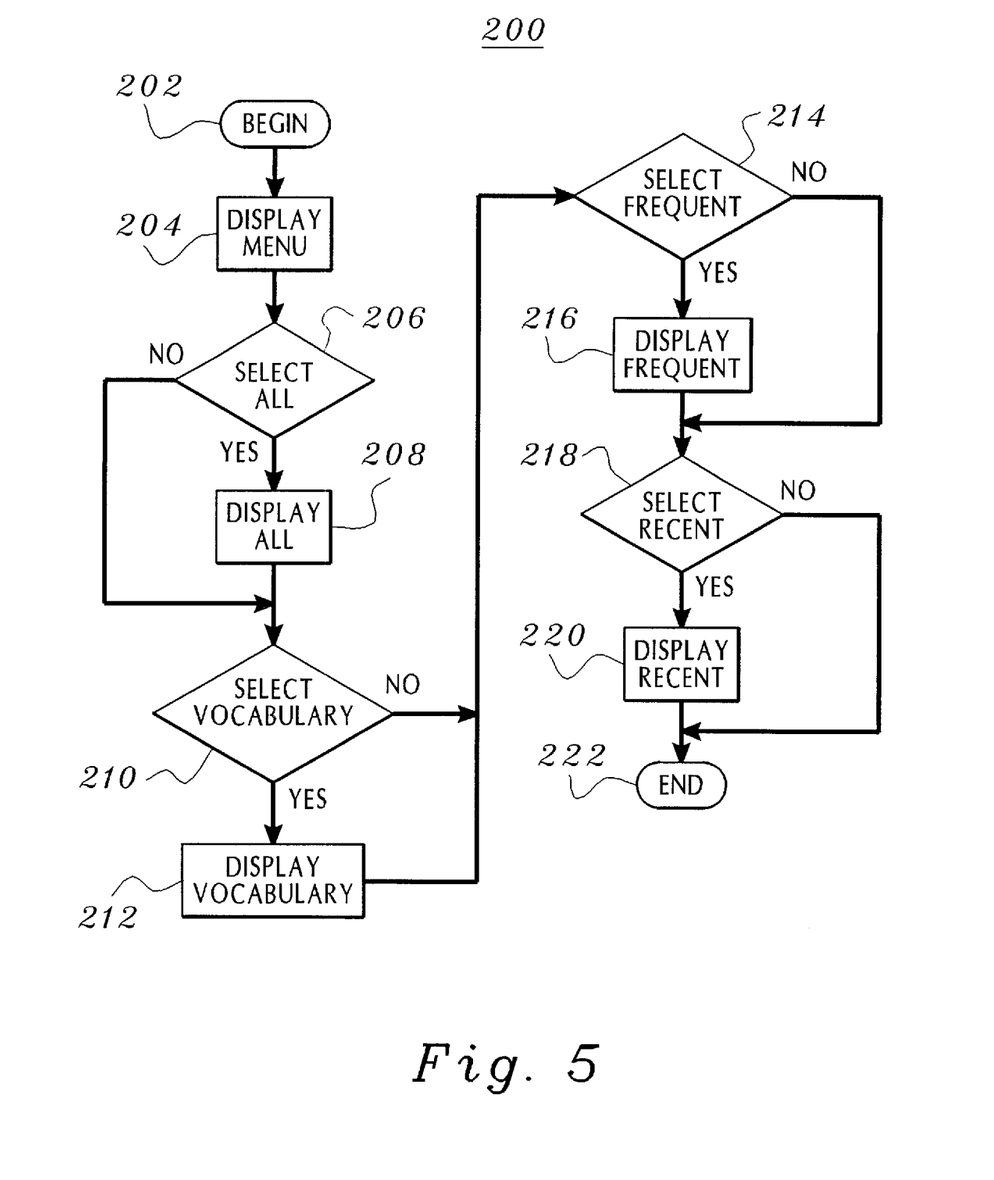
FIG. 5 depicts the menu selection process.

FIG. 5 depicts the menu display. The menu displays four initial choices. The user may select "all" (206) in which case all of the dictionary entries are listed in alphabetical order (208) which can then be further sorted by most frequent or most recent. The alphabetical list can be navigated by scrolling or by entering a word prefix. If a word prefix is entered the word closest to the prefix will move to the center of the display and the user can navigate forward or backward from that word by scrolling. If the user selects "vocabulary", the word lists grouped by vocabulary function will appear (212). The word lists can then be navigated by scrolling through the list or by entering a word prefix. If the user selects "frequent" all of the entries will be displayed rank ordered with the most frequent entries displayed first. The user may also select "frequent", after having selected "vocabulary", in which case the vocabulary word list will be displayed rank ordered with the most frequent displayed first The user may select "recent", in which case all of the entries will be displayed rank ordered, with the Most recent displayed first. The user may also select "recent" after having selected "vocabulary" in which case the vocabulary word list will be displayed rank ordered with the most recent displayed first.

When a message is sent the directory entry, directory address, or recipient address is set to contain a link to the list of macros and action entries that comprise the message. For example, in one embodiment, only the pointers are stored in memory. For macros and messages, the pointers are stored in sequence so that when a past message is selected, the entire message will be displayed. This reduces the storage required to keep a history of last messages or words that have been stored.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A method for creating messages for electronic transmission by a transmission device comprising the steps of:

displaying a menu with a plurality of options at the transmission device;

selecting one of said options from said menu;

creating a dictionary in a memory of the transmission device from which a plurality of texts may be selected;

selecting a first text;

selecting a second text;

creating a message by linking said first text and said second text;

sending said message; and wherein said dictionary may be expanded by a user spelling a created text using an entry device and by entering the created text into the dictionary.

2. The method of claim 1 wherein the step of selecting a first text further comprises entering a telephone number or directory entry linked to a pre-selected vocabulary grouping.

3. The method of claim 1 further comprising the step of adding an additional text.

4. The method of claim 1 further comprising the step of deleting said first text or said second text.

5. The method of claim 1 further comprising the steps of:

displaying a menu; and selecting either one of all, vocabulary, frequent or recent from said menu or selecting according to user preference.

6. The method of claim 1 further comprising inserting a voice recording made by the user at the transmission device into said message.

7. The method of claim 1 further comprising storing said message by saving a first pointer to said message, a second pointer to said first text and a third pointer to said second text wherein said first pointer, said second pointer, and said third pointer are sequentially, linked so that when said first pointer is invoked, said message is displayed.

8. The programmable apparatus of claim 7 wherein, responsive to instructions from said entry device, said program stores pointers to said text in memory.

9. The programmable apparatus of claim 7 further comprising responsive to instructions from said entry device and said memory, said processor inserts a voice recording made by the user at the transmission device into said message.

10. The method of claim 1 further comprising downloading a pre-packaged list of words and phrases directly into the memory of the transmission device.

11. The method of claim 1 further comprising selecting a text from a displayed message received by the transmission device and saving the selected text in the memory.

12. The method of claim 11 wherein the text is selected by highlighting a portion of the displayed message.

13. The method of claim 1 where one of said options presents word lists grouped by vocabulary function.

14. A programmable apparatus for creating and sending electronic messages comprising, programmable hardware comprising;

a memory;

a processor;

a display;

an entry device;

a transmitter/receiver;

a power supply;

an interface electronically connected to said memory, said processor, said display, said entry device, said transmitter/receiver and said power supply;

a program installed in said memory;

wherein said program creates a dictionary in the memory which may be expanded by a user spelling a created text using an entry device and by entering the created text into the dictionary;

wherein said program, responsive to instructions from said entry device, performs the following steps:

displays a menu with a plurality of options;

selects one of aid options from said menu;

creates a message by copying a first text from said dictionary, a second text from said dictionary, and links said first text and said second text; and sends said message.

15. The programmable apparatus of claim 14 further comprising downloading a pre-packaged list of words and phrases directly into the memory of the transmission device.

16. The programmable apparatus of claim 14 further comprising selecting a text from a displayed message received by the programmable apparatus and saving the selected text.

17. The programmable apparatus of claim 16 wherein the text is selected by highlighting a portion of the displayed message.

18. The programmable apparatus of claim 14 wherein one of said options presents word lists grouped by vocabulary function.

19. A computer readable memory for causing a computer to create a dictionary for use in electronic transmission comprising:
- a processor readable storage medium;
- a program stored in said storage medium;
- the storage medium, so configured by said program, responsive to instructions from an entry device, causes the processor to:
- display a menu with a plurality of options;
- select one of said options from said menu;
- create a dictionary in the storage medium which may be expanded by a user spelling a created text using the entry device and by entering the created text into the dictionary;
- select a first term from said dictionary;
- select a second term from said dictionary;
- link said first term to said second team, thereby creating a message; and
- transmit said message.

20. The storage medium of claim 19, wherein text selected from an incoming message is stored in said dictionary.

21. The computer readable memory of claim 19 wherein selected vocabulary groups are linked to a telephone number or directory entry.

22. The computer readable memory of claim 19 further comprising downloading a pre-packaged list of words and phrases directly into the memory of the transmission device.

23. The computer readable memory of claim 19 further comprising selecting a text from a displayed message received by the computer readable memory and saving the selected text.

24. The computer readable memory of claim 23 wherein the text is selected by highlighting a portion of the displayed message.

25. The computer readable memory of claim 19 wherein one of said options presents word lists grouped by vocabulary function.

26. A processor implemented process to accomplish creating and sending of messages from a digital phone comprising:
- displaying a menu with a plurality of options;
- selecting one of said options from said menu;
- creating a dictionary in a memory of the digital phone;
- selecting a first text and a second text from said dictionary;
- linking said first text and said second text;
- sending a message consisting of said first text and said second text; and
- wherein said dictionary may be expanded by a user spelling a created text using an entry device and by entering the created text into the dictionary.

27. The process of claim 26 further comprising the step of storing said message by saving a first pointer for said message, a second pointer for said first text and a third pointer for said second text; wherein said first pointer, said second pointer and said third pointer are linked in sequence so that said message can be fully displayed by accessing said first pointer.

28. The dictionary of claim 26 further comprising words, symbols, macros and graphics.

29. A method for creating and sending messages from a digital phone having an entry device, a processor, a memory and a display, the method comprising the computer implemented steps of:
- responsive to a first signal from the entry device, executing instructions from the memory to display a menu;
- responsive to a second signal from said entry device, executing instructions from the processor to select an option from the memory;
- responsive to a third signal from said entry device, executing instructions from the processor to select a first text from said dictionary;
- responsive to a forth signal from said entry device, executing instructions from a processor to select a second text from said dictionary;
- responsive to a fifth signal from said entry device, executing instructions from a processor to link said first text and said second text into a message;
- responsive to sixth signal from said entry device, executing instructions from said processor to transmit said message; and
- wherein responsive to one or more seventh signals from said entry device, executing instructions from the processor to spell a created text and responsive to an eighth signal from said entry device, entering the created text into the dictionary.

30. The method of claim 29 further comprising the step of saving a first pointer for said message, a second pointer for said first text and a third pointer for said second text.

31. The method of claim 29 further comprising the computer implemented steps of:
- responsive to an eighth signal from the entry device, executing instructions from a processor to select a text from a displayed massage at the digital phone, and responsive to a ninth signal from the entry device, executing instructions from the processor to save the selected text.

32. The method of claim 31 further comprising the computer implemented step of:
- responsive to a tenth signal from the entry device, executing instructions from the processor to select the text from the displayed message at the digital phone by highlighting a portion of the displayed message.

33. A computer program product on a computer-readable medium for creating and sending messages on a digital phone, the computer program product comprising:
- first instructions from a program in a memory of the digital phone to display a menu having at least one option;
- responsive to a first signal from an entry device selecting at least one option, second instructions from said program to display a plurality of text options corresponding to said selection;
- responsive to a second signal from an entry device, third instructions from said program to display a first text selection;
- responsive to a third signal from an entry device, fourth instructions from said program to display a second text selection;
- responsive to a fourth signal from said entry device, fifth instructions from said program to link said first text selection and said second text selection;
- responsive to a fifth signal from an entry device, sixth instructions from said program to transmit said message; and wherein responsive to one or more seventh signals from the entry device, one or more seventh instructions from said program to spell a created text and responsive to an eighth signal from said entry device, eighth instructions from said program to enter the created text into the dictionary.

34. The computer program product of claim 33 further comprising, responsive to a sixth signal from an entry device, seventh instructions from said program to save a pointer for said message, for said first text selection and for said second text selection.

35. The computer program product of claim 33 further comprising:

responsive to an ninth signal from the entry device, ninth instructions from said program to select a text from a displayed message and responsive to a tenth signal from the entry device, tenth instructions from said program to save the selected text.

36. The computer program product of claim 32 further comprising:

responsive to a eleventh signal from the entry device, eleventh instructions from the program to select the text from the displayed message by highlighting a portion of the displayed message.

* * * * *

UNITED STATES PATENT AND TRADEMARK OFFICE
CERTIFICATE OF CORRECTION

PATENT NO.      : 6,553,103 B1
DATED           : April 22, 2003
INVENTOR(S)     : Forlenza et al.

It is certified that error appears in the above-identified patent and that said Letters Patent is hereby corrected as shown below:

Column 3,
Lines 58 and 62, "20" should be -- 11 --
Lines 58 and 63, "30" should be -- 14 --
Line 58, "40" should be -- 15 --
Line 58, "50" should be -- 16 --
Line 59, "60" should be -- 17 --
Line 59, "70" should be -- 18 --

Column 4,
Line 10, "40" should be -- 15 --
Lines 11 and 28, "30" should be -- 14 --
Lines 29 and 35, "50" should be -- 16 --
Line 29, "receiver/transmitter" should be -- transmitter/receiver --
Line 29, "60" should be -- 17 --
Line 29, "70" should be -- 18 --
Line 30, "20" should be -- 11 --
Line 30, "22" should be -- 12 --
Lines 31 and 32, "26" should be -- 13 --
Line 31, "24" should be -- 20 --
Line 32, "18" should be -- 9 --
Line 53, "program" should be -- program 20 --
Line 55, "dictionary program 20 begins (22) and a -- should be inserted before "pre-packaged"
Line 56, "14" should be -- 24 --
Line 67, "16" should be -- 26 --
Line 67, "may" should be deleted
Line 67, after "a user" insert -- has the option (28) to --

Column 5,
Line 2, "20" should be -- 30 --
Line 3, "messages" should be -- messages (32) --
Line 4, "24" should be -- 34 --
Line 8, "26" should be -- 36 --
Line 9, "28" should be -- 38 --
Line 11, "recipient" should read -- recipient (40) --

UNITED STATES PATENT AND TRADEMARK OFFICE
CERTIFICATE OF CORRECTION

PATENT NO. : 6,553,103 B1
DATED : April 22, 2003
INVENTOR(S) : Forlenza et al.

It is certified that error appears in the above-identified patent and that said Letters Patent is hereby corrected as shown below:

Column 5 (cont'd),
Line 12, "32" should be -- 42 --
Line 14, "34" should be -- 44 --
Line 16, "number" should be -- number (46) --
Line 29, "38" should be -- 48 --
Line 32, "dictionary" should be -- dictionary (60) --
Line 36, insert -- the program begins (62) and -- after "storage"

Column 6,
Line 19, "all" should be -- "all" (116) --
Line 24, "recent" should be -- "recent" (130) --
Lines 63 and 65, "(112)" should be deleted
Line 66, "display" should be -- display (200) --
Line 66, "menu" should be -- menu begins (202) and --
Line 67, "choices" should be -- choices (204) --

Column 7,
Line 7, "vocabulary" should be -- "vocabulary" (210) --
Line 11, "frequent" should be -- "frequent" (214) --
Line 12, "first" should be -- first (216) --
Line 16, "recent" should be -- "recent" (218) --
Line 17, "Most" should be -- most --
Line 18, "first" should be -- first (220) --
Line 21, after "first." insert -- The menu then ends (222). --

Column 8,
Line 13, "sequentially," should be -- sequentially --
Lines 15 and 18, "7" should be -- 14 --
Line 34, "comprising:" should be -- comprising: --

UNITED STATES PATENT AND TRADEMARK OFFICE
CERTIFICATE OF CORRECTION

PATENT NO.    : 6,553,103 B1
DATED         : April 22, 2003
INVENTOR(S)   : Forlenza et al.

It is certified that error appears in the above-identified patent and that said Letters Patent is hereby corrected as shown below:

<u>Column 8 (cont'd)</u>,
Line 53, "aid" should be -- said --

Signed and Sealed this

Nineteenth Day of August, 2003

JAMES E. ROGAN
*Director of the United States Patent and Trademark Office*